United States Patent [19]
Ito et al.

[11] Patent Number: 6,039,250
[45] Date of Patent: Mar. 21, 2000

[54] ELECTRONIC MONEY SENDING SYSTEM

[75] Inventors: Atsushi Ito, Meguro-ku; Masaaki Hiroya, Yokohama, both of Japan

[73] Assignee: Hitachi, Ltd., Tokyo, Japan

[21] Appl. No.: 08/981,810

[22] PCT Filed: Jul. 3, 1996

[86] PCT No.: PCT/JP96/01840

§ 371 Date: Jan. 6, 1998

§ 102(e) Date: Jan. 6, 1998

[87] PCT Pub. No.: WO97/02539

PCT Pub. Date: Jan. 23, 1997

[30] Foreign Application Priority Data

Jul. 6, 1995 [JP] Japan ..................................... 7-170683

[51] Int. Cl.[7] .................................................. G06F 17/60
[52] U.S. Cl. ............................ 235/380; 235/379; 902/25
[58] Field of Search ..................... 235/380, 379, 235/382; 902/2, 10, 25

[56] References Cited

U.S. PATENT DOCUMENTS

| | | | |
|---|---|---|---|
| 3,778,595 | 12/1973 | Hatanaka et al. | 235/380 |
| 4,408,203 | 10/1983 | Campbell | 235/379 |
| 4,454,414 | 6/1984 | Benton | 235/379 |
| 4,709,136 | 11/1987 | Watanabe | 235/380 |
| 4,745,265 | 5/1988 | Douno et al. | 235/379 |
| 5,175,416 | 12/1992 | Mansvelt et al. | 235/379 |
| 5,283,829 | 2/1994 | Anderson | 235/379 |
| 5,461,217 | 10/1995 | Claus | 235/380 |
| 5,650,604 | 7/1997 | Marcous et al. | 235/379 |
| 5,691,525 | 11/1997 | Aoki et al. | 235/379 |
| 5,949,044 | 9/1999 | Walker et al. | 235/379 |

*Primary Examiner*—Donald Hajec
*Assistant Examiner*—Daniel St. Cyr
*Attorney, Agent, or Firm*—Antonelli, Terry, Stout & Kraus, LLP

[57] ABSTRACT

To a communication network there is connected an electronic money server that temporarily stores electronic money. The remittance of electronic money from a remitter to a receiptor is carried out by dividing the remittance process into two steps, namely, the remittance from the remitter to the electronic money server and the remittance from the electronic money server to the receiptor. When the electronic money server receives [an] electronic money from a remitter, the electronic money server sends to a receiptor an electronic mail message saying that a payment of electronic money has been received. The receiptor requests the electronic money server to transfer the received electronic money based on this electronic mail message. Further, to prevent electronic money from remaining in the electronic money server for an excessive time, the electronic money server is provided with a time management unit, and if a receiptor leaves electronic money in the electronic money serve until a certain period of time passes, the electronic money server sends a reminder to the receiptor or refunds the electronic money to the remitter.

13 Claims, 6 Drawing Sheets

FIG.5

| AMOUNT | REMITTER'S ADDRESS | RECEPTOR'S ADDRESS | IDENTIFIER | SECURITY KEY |
|---|---|---|---|---|
| $100.00 | itou@abc.de.jp | store@fgh.ijk.us | abc01234 | 654321 |

| RECEPTION TIME | RETENTION PERIOD | AMOUNT | REMITTER'S ADDRESS | RECEPTOR'S ADDRESS | IDENTIFIER | SECURITY KEY | STATUS CODE |
|---|---|---|---|---|---|---|---|
| 960504 11:23 | 7 days | $100.00 | itou@... | store@... | abc01234 | 654321 | 10101 |
| 960505 16:22 | 7 days | $56.20 | Tom@... | Shop@.. | abc12345 | | 11000 |
| | | | | | | | |

| RECEIPTOR'S ADDRESS | CONDITION | ACCOUNT NUMBER | SPECIAL REMARKS |
|---|---|---|---|
| store@fgh.ijk.us | 1 | 001-123-456-78901 | |
| itou@abc.de.jp | 0 | 001-345-678-90123 | |
| | | | |

| REMITTER'S ADDRESS | RECEIPTOR'S ADDRESS | IDENTIFIER | SECURITY KEY |
|---|---|---|---|
| itou@abc.de.jp | store@fgh.ijk.us | abc01234 | 876541 |

801 802 803 804

ELECTRONIC MONEY SENDING SYSTEM

FIELD OF THE INVENTION

The present invention relates to a method of remitting an electronic money through a communication network, particularly to a system that enables remittance not depending on the conveniences of a receiptor.

BACKGROUND ART

A new banking system is coming into reality, which uses an electronic money being an "electronic data" having the same value as cash. Transferring electric money is carried out in the electronic money system, in which an electronic money information is stored in an exclusive IC card and the electronic money information is sent and received between two IC cards through exclusive equipment and terminals. Such a system is disclosed, for example, in the international application published under PCT as Number: WO 91/16691. In this example, a mutual certification is made directly between IC cards when a transaction occurs.

In the conventional electronic money system, a remitter directly communicates with the other party for remittance (receiptor of the electronic money) through a communication network to set up a communication line between the IC card of the other party and that of the remitter, thus directly remitting an electronic money. Therefore, if the other party is not present, or, although being present, if the other party has not yet set the IC card in the card reader, the communication line between the IC cards of both parties is not set up, which makes impossible of remittance.

The present invention has been made in view of the foregoing circumstances, and it is therefore an object of the invention to provide an electronic money remittance system that enables to remit an electronic money even if a direct communication with the other party for remittance cannot be made.

Another object of the invention is to provide an electronic money remittance system that can easily switch a remittance method into another if an electronic money cannot be sent to the other party for remittance on any reason.

Further, another object of the invention is to provide an electronic money remittance system that can remit an electronic money to the other party by an indirect remittance through a third party, not depending on the conveniences of the other party.

DISCLOSURE OF THE INVENTION

In order to accomplish the foregoing objects, the system according to the invention is provided with an information processing unit (hereunder, referred to as an electronic money server) for temporarily storing an electronic money, which is connected to a communication network. The electronic money server contains at least communication means, electronic money processing means, and storage means. A remittance from a remitter to a receiptor is carried out to be divided into two steps, a remittance from the remitter to the electronic money server and a remittance from the electronic money server to the receiptor.

This electronic money server is installed in an organization that brokers the remittance of an electronic money; for example, a financial institution such as a bank is supposed to provide such a service. This service may be carried out on free of charge, or on a certain charge basis. Important is that the remittance of an electronic money to the electronic money server can be carried out for 24 hours, and the received electronic money can securely be stored to remit to the receiptor or to refund to the remitter.

An IC card carrier, namely, a remitter sends a remittance request to the electronic money server. This remittance request contains a receiptor identifying information such as an electronic mail address or other identifying information. Thereafter, a communication line is set up between the IC card of the remitter and the IC card set in the electronic money server to send an electronic money. The remitted electronic money is stored in the IC card in the electronic money server, and a remitter identifying information such as an electronic mail address of the remitter and a receiptor identifying information are stored in a storage device other than the IC card such as a hard disk.

When the electronic money server receives an electronic money from a remitter, the electronic money server sends to the remitter an electronic mail saying that the electronic money server has received the electronic money from the remitter, and to the receiptor sends an electronic mail saying that the electronic money from the remitter has been received. Based on this electronic mail, the receiptor requests the reception of the electronic money to the electronic money server. This transaction is processed between the two parties, the electronic money server and the receiptor. Important here is that the receiptor can receive the electronic money from the electronic money server for 24 hours.

When the electronic money server receives a request for receiving the electronic money from the IC card carrier (receiptor), the electronic money server collates a receiptor identifying information contained in the reception request with information stored in the foregoing hard disk drive and the like. When the collation results in coincidence, the electronic money server sends the stored electronic money to the receiptor; and when the collation does not coincide, the electronic money server refunds the electronic money to the remitter.

Further, the electronic money server is provided with a time management unit in order to avoid an electronic money from remaining to be stored in the electronic money server. And, if the receiptor leaves the electronic money without receiving it till a certain period of time passes, the electronic money server sends a reminder to the receiptor, or refunds the electronic money to the remitter, thus preventing the electronic money from remaining to be stored in the electronic money server.

As mentioned above, the provision of the electronic money server divides the remittance from the remitter to the receiptor into two steps, and the remittance of each step is carried out directly, which achieves an indirect remittance system without modifying the existing system. Further, the electronic money server is provided with the time management unit, which enables to send a reminder to the receiptor or to refund the electronic money to the remitter if the electronic money is not received for a certain period of time.

BRIEF DESCRIPTION OF THE DRAWINGS

FIG. 5 is a chart showing an information sent from the remitter to the electronic money server when the remitter requests the electronic money server to stand by for remittance;

FIG. 6 is a management list of a proposal that an indirect remittance is requested, to be controlled in a storage unit 150 of the electronic money server 3;

FIG. 7 is a list that the remitter and receiptor register in advance with a bank; and FIG. 8 is a chart showing an information sent from the receiptor to the electronic money server when the receiptor requests the electronic money server to stand by for remittance.

BEST MODE FOR CARRYING OUT THE INVENTION

Figure 1:
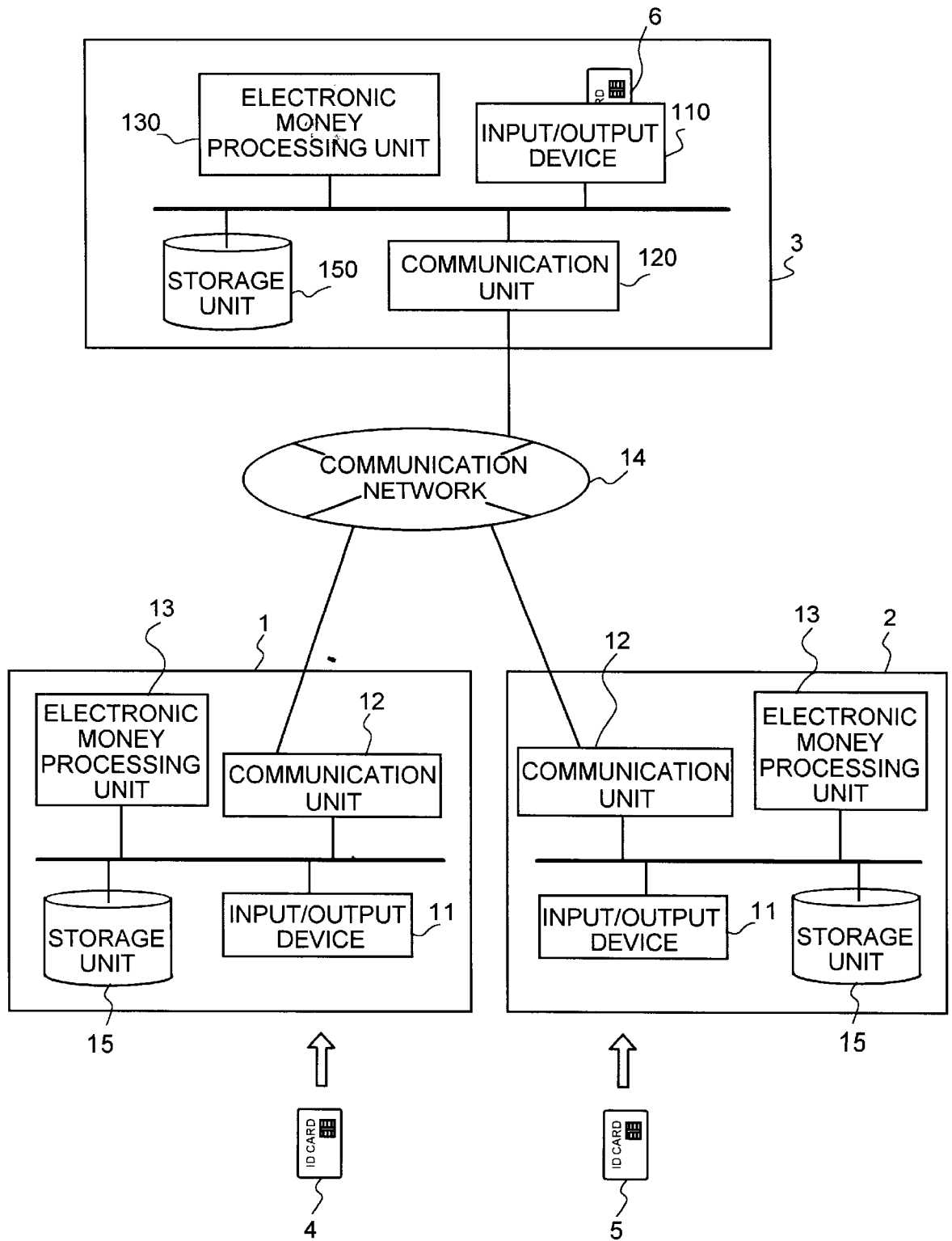
FIG. 1 is a block diagram illustrating a system configuration of the present invention.

FIG. 1 is a block diagram illustrating a system configuration of the invention. An information processing unit 1 and information processing unit 2 are the units corresponding to a remitter and receiptor of an electronic money. Although only two units are shown in the drawing, there are great many in reality.

The information processing units 1, 2 basically take the same configuration, which contains an input/output device 11 that reads and writes in an IC card, an electronic money control unit 13 that controls to send and receive an electronic money and an electronic mail, a communication device 12 that connects the information processing unit to a communication network 14, and a storage unit 15.

IC cards 4, 5 are storage media for electronic moneys, each of which contains an arithmetic unit and a nonvolatile memory. The Ic card is well known, and the detailed description will be omitted; however, important is that the electronic money, being an electronic data having the same value as cash, is to be made so as to be immune from counterfeit. Therefore, an electronic money information is not stored in the storage unit 15 or other memories, but always stored in the IC card.

The input/output device 11 reads and writes in information on the IC cards 4, 5 through metal contacts or by means of radio waves, and a well known IC card reader/writer can be used for this.

The electronic money control unit 13 sends and receives an electronic money and an electronic mail, and controls the total equipment. This control unit includes a CPU. The storage unit 15 is used to store a program executed by the electronic money control unit 13, to store electronic mails sent and received, and to record histories of electronic transactions.

The electronic money server 3 functions as a server that brokers the remittance of an electronic money, which is installed, for example, in a bank. The constitution of electronic money server 3 includes the information processing units 1, 2, and a communication control unit 120, through which the electronic money server 3 is connected to the communication network 14. Here, a processing unit 130 functions as an electronic money processing unit and a controller of a banking system. A storage unit 150 stores information on bank accounts and information necessary for the electronic money server.

An input/output device 110 has an IC card 6 for the electronic money server set in to read and write in information, and plural IC cards can be set therein as needed. Important here is that more than one IC cards 6 must always be set in to respond to remittance and reception for 24 hours.

The communication network 14 is an arbitrary two way communication network such as a LAN, VAN, Internet, and telephone lines.

Next, a processing flow will be described with reference to FIG. 2, in which a remitter using the information processing unit 1 sends an electronic money to a receiptor using the information processing unit 2.

Suppose that a remitter has to send a money by any reason. There are many cases for such circumstances, such as a case to spontaneously send a money to a specific party (individual, corporation), a case to pay the charge for a commodity bought through an on-line shopping, and a case to remit for a bill sent by an electronic mail through a communication network 14. A remittance is carried out as follows: for example, a person (receiptor) who wants to receive an electronic money sends to a remitter in advance a requisition information including at least an amount and an identifier inherent to the receiptor as a data; and being prompted by a display saying that "A bill for ¥100 from Mr. B has been received. Will you remit?", the remitter pushes a button for remittance.

The remitter sets the IC card 4 in the input/output device 11 of the information processing unit 1, and prepares to remit an electronic money to the receiptor (the other party for remittance) (step 200). Concretely, the remitter executes a remittance standby request to the receiptor (step 201), and waits for the response from the receiptor. If the receiptor responds to this remittance standby request with OK, namely, the communication line between the IC cards of both the parties is set up, the remitter is only needed to carry out the conventional direct remittance. If the receiptor does not respond, namely, the communication line between the IC cards of both the parties is not set up, the system presents a display saying that "No response from the receiptor is available. Will you take an indirect remittance?", and prompts the remitter to take the indirect remittance.

Next, to carry out the indirect remittance, the remitter chooses the electronic money server 3 out of a plurality of electronic money servers (step 202). The remitter chooses, for example, the electronic money server provided by the bank that the remitter or the receiptor has an account with.

Next, the remitter sends a remittance standby request to the electronic money server 3 chosen from the information processing unit 1 (step 203). FIG. 5 illustrates an information sent by this remittance standby request. The information includes an amount 501 to be sent, a remitter's address 502 being an electronic mail address of the remitter, receiptor's address 503 being an electronic mail address of the receiptor, identifier 504 being the number to identify a bill number and a transaction from the remitter to the receiptor, and a security key 505 being a password used between the remitter and the receiptor, or being a cipher key in case a transaction is performed under encipherment. For the security key, for example, a random number sequence may be sent which is served as a seed for encipherment.

The electronic money server 3 stands by for receiving an electronic money, and informs to the information processing unit 1 of the completion of the standby as soon as the standby is complete (step 204, 205). And, the electronic money server 3 sets up a communication line between the IC card 4 of the remitter and the IC card 6 of the electronic money server 3 to send an electronic money (step 206). The detailed procedure of the step 206 is well known through, for example, the international application published under PCT as Number: WO 91/16691, and the description will be omitted.

Next, the electronic money server 3 sends an electronic mail to confirm the reception of the electronic money (step 207). Receiving this electronic mail, the remitter stores the mail in the storage unit 15. Thereby, the trouble as to whether or not the remittance is actually carried out can be reduced. The remitter informs to the receptor that the remittance is carried out indirectly by an electronic mail (step 208). This step is not necessarily required, and the electronic money server 3 may send to the receptor, as shown by the dotted line 209, an electronic mail saying that the remittance is received. Or, both may be combined.

Figure 3:
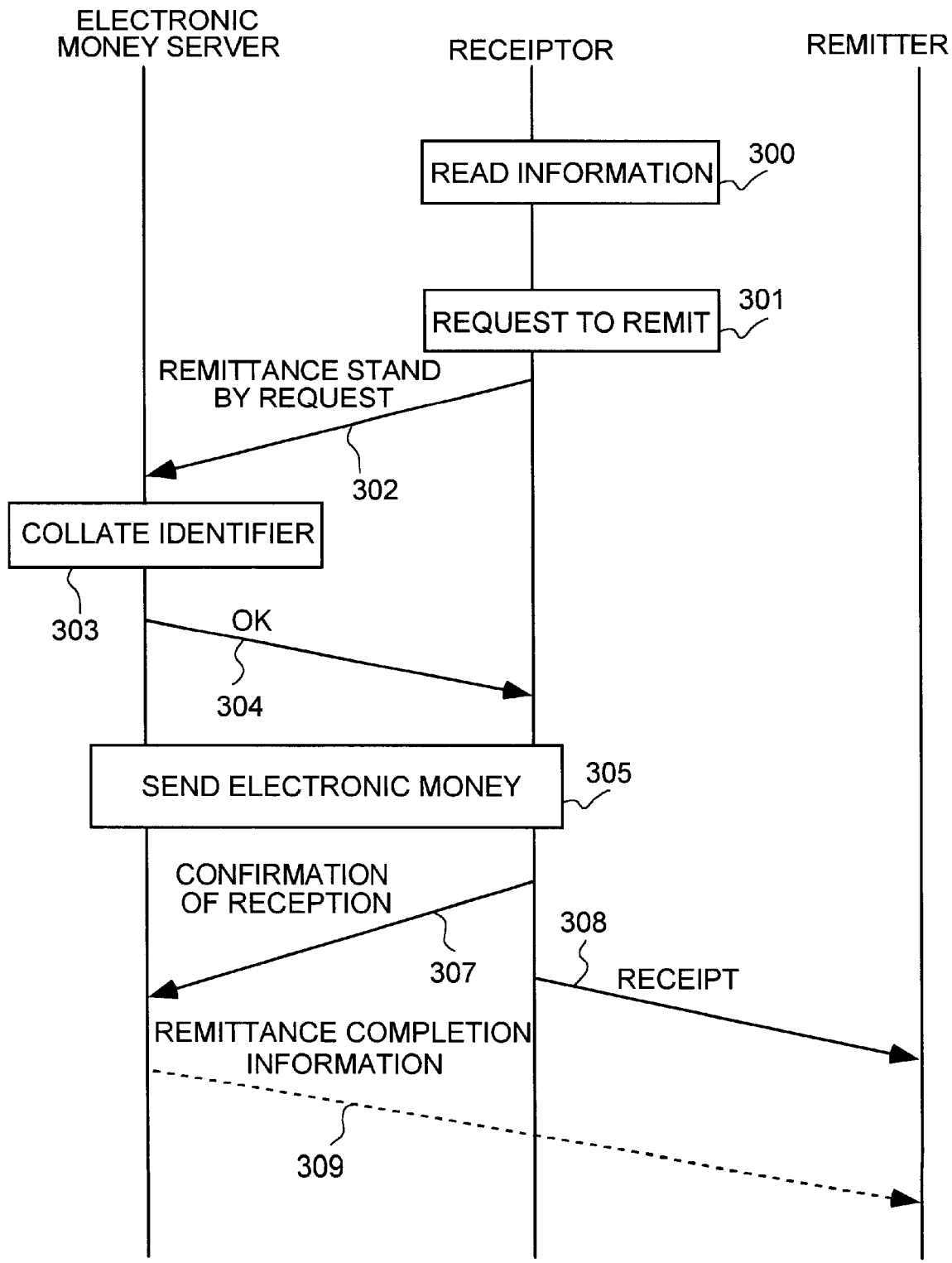
FIG. 3 illustrates a flow of processing when a receiptor receives an electronic money from an electronic money server 3 in the invention.

Next, the procedure that the receptor who received a remittance information receives an electronic money from the electronic money server 3 will be described with reference to FIG. 3.

The receptor who received a remittance information from the remitter or the electronic money server 3 reads an electronic mail saying, for example, "$100 from Mr. A has been received. Will you receive?", and starts the reception processing of an electronic money (step 300).

The receptor sets the IC card 5 of his or her own in the input/output device 11 of the information processing unit 2, and requests the electronic money server 3 to remit (step 301). Then, a remittance standby request is sent to the electronic money server 3 (step 302). FIG. 8 illustrates an information sent by this remittance standby request.

The information includes a remitter's address 801 being an electronic mail address of the remitter, receptor's address 802 being an electronic mail address of the receptor, identifier 803 being the number to identify a bill number and a transaction from the remitter to the receptor, and a security key 804 being a password used between the remitter and the receptor, or being a cipher key in case a transaction is carried out under encipherment. These information are registered in the storage unit 15 of the information processing unit 2, when a transaction is carried out. And, all of these information are not necessarily required to be sent. For example, only the receptor's address 802 may be arranged to be sent.

Next, the electronic money server 3 collates the identifier 606 with the identifier 803, or the other information, and decides if it is proper to remit or not (step 303). If it is confirmed positive, the electronic money server 3 informs the receptor of the result (step 304), and sends the electronic money (step 305). When the electronic money server 3 completes to send the electronic money, the receptor performs a reception confirmation of the electronic money (step 307). Thereby, the trouble as to whether the remittance is actually performed or not can be avoided. Further, the receptor issues a receipt to the remitter if needed (step 308). And, the electronic money server 3 may send a remittance completion information to the remitter (step 309). This remittance completion information 309 is effective in such a case that a person remits spontaneously to another person, not in a case that a money is paid afterwards for a requisition based on a business transaction and the like.

Next, a processing procedure by the electronic money server 3 will be described with reference to FIG. 4, 6, and 7.

FIG. 6 is a management list of a proposal that an indirect remittance is requested, to be controlled in the storage unit 150 of the electronic money server 3. A reception time 601 is a time when the electronic money server 3 receives a remittance from a remitter to a receptor. A retention period 602 indicates a period during which the electronic money server 3 keeps an electronic money, and indicates that the electronic money server 3 refunds the electronic money to the remitter after the retention period passes from the reception day. The retention period may be fixed from the beginning, or it may be set based on the remitter's request, or it may be set in correspondence with the amount. An amount 603 indicates the amount remitted. Incidentally, it should be noted that the electronic money of this amount is not stored in the storage unit 150. In addition to the foregoing reception time 601 and the retention period 602, a remitter's address 604, receptor's address 605, identifier 606, and security key 607 are stored in the storage unit 150. The information of these items from 603 through 607 are stored at a time when the information from 501 through 505 are sent from the remitter. A status code 608 is a code for indicating a processing status in the electronic money server 3. The leading one bit indicates a flag showing that a remittance from a remitter is complete, the next one bit indicates a flag showing that a remittance to a receptor is complete, further the next one bit indicates a flag showing that a remittance to a receptor is completed by paying in into the receptor's bank account, and so on, which indicates various status codes.

FIG. 7 is a list that a remitter and a receptor register in advance with a bank, which instructs to automatically pay in a remitted money into a bank account when any party becomes the receptor. When a bank provides the electronic money server 3 and the receptor has an account in the bank, in stead of remitting an electronic money to the receptor, it is more effective to transfer the electronic money to the receptor's bank account to complete the remittance. In order to carry out the foregoing, in the storage unit 150 are registered a receptor's address 701, condition 702 being a flag showing whether or not a money is to be paid in unconditionally into a bank account, bank account number 703 indicating the paying-in destination, special remarks 704 indicating conditions in processing.

Next, referring to FIG. 4, a processing procedure in the processing unit 130 of the electronic money server 3 will be described. This procedure is performed by a computer programming, which repeatedly executes the process from the start to the end in FIG. 4.

Figure 4:
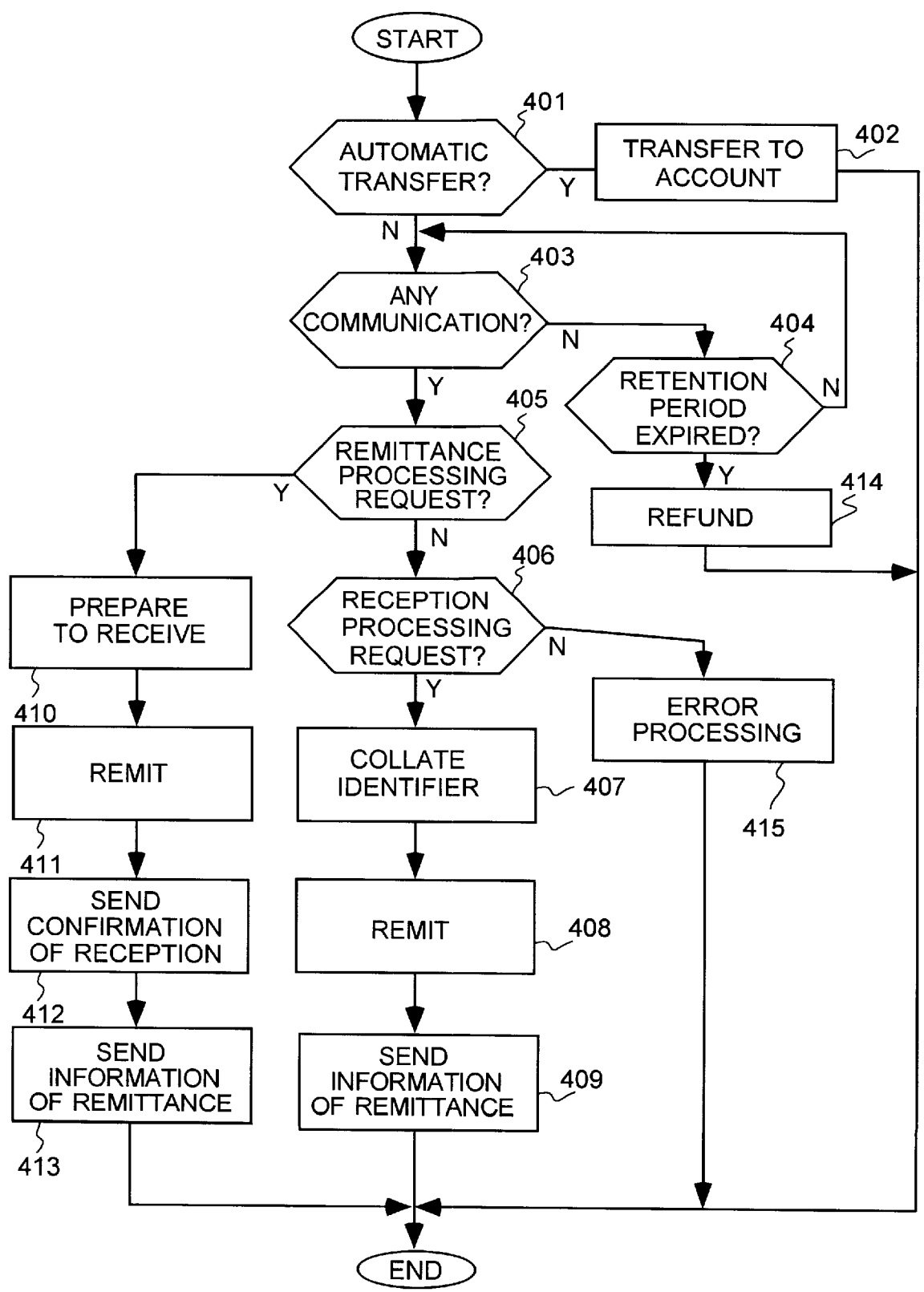
FIG. 4 is a flowchart showing a processing procedure by the electronic money server 3.

In FIG. 4, the processing unit 103 decides whether or not the receptor's address 605 on the table in FIG. 6 contains addresses registered in the receptor's address 701 in FIG. 7, namely, whether or not addresses to be transferred automatically are present (step 401). If it contains the addresses, the processing unit 130 checks the condition 702; and if the condition 702 indicates an unconditional deposit into an account, the processing unit 130 transfers the electronic money to the account, informs to the receptor that the money has been transferred, and sends the remittance completion information to the remitter (step 402).

If the receptor's address 605 does not contain the addresses to be transferred automatically at step 401, the processing unit 130 decides whether a communication from the remitter or the receptor is received or not (step 403). If the communication is received, the processing unit 130 decides whether or not it is a request for remittance processing from the remitter, or whether or not it is a request for reception processing from the receptor (step 405, 406). If the communication indicates the request for reception processing from the electronic money server 3 by the receptor, the processing unit 130 retrieves whether or not the receptor's address is registered in the receptor's address 605 in FIG. 6. If it is registered, the processing unit 130 decides whether the identifier 606 of the receptor's address coincides with the identifier 803 or not (step 407). If it coincides, the processing unit 130 carries out the remittance processing as in FIG. 3, and sends a remittance information (step 408, 409).

Figure 2:
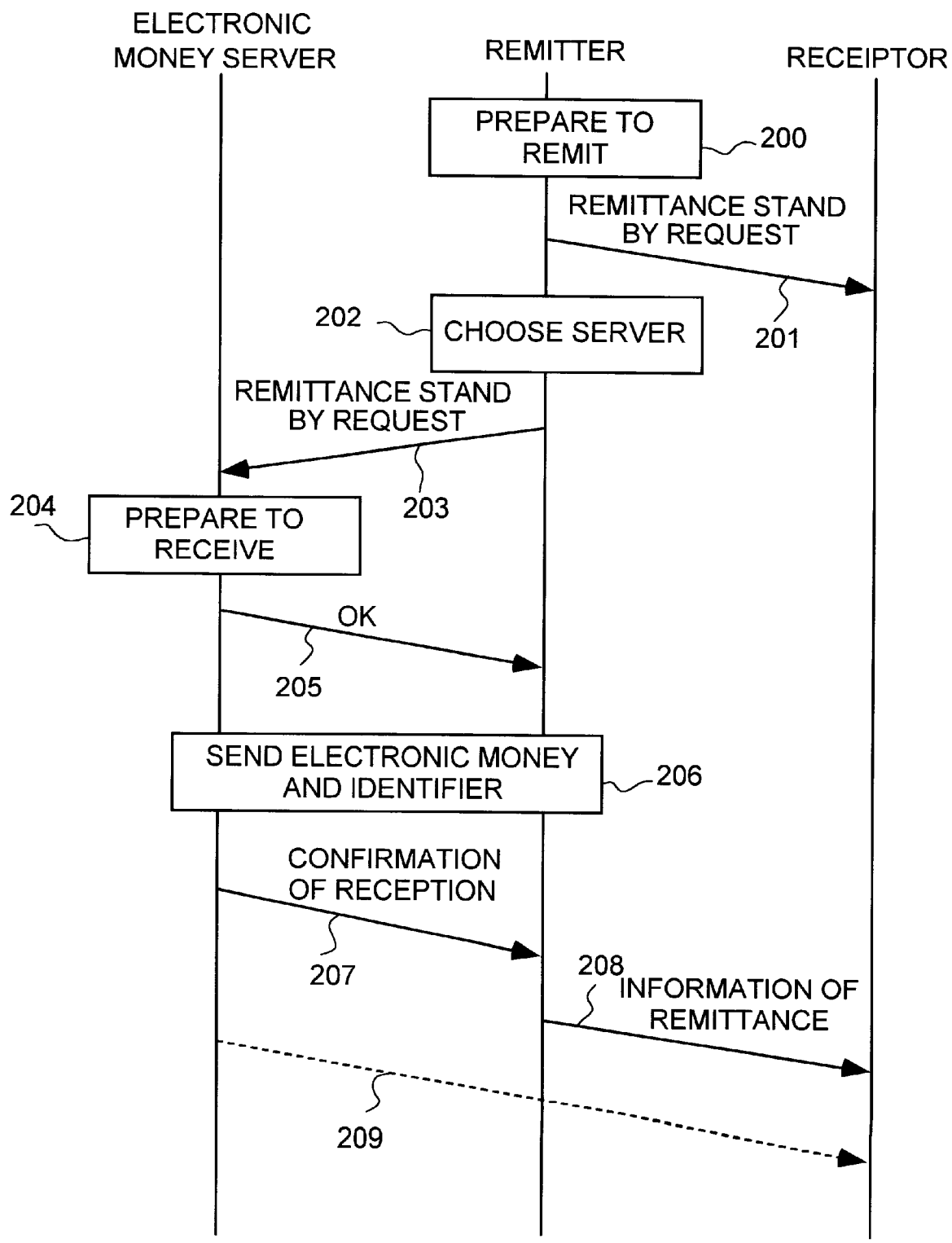
FIG. 2 illustrates a flow of an indirect remittance processing according to the invention.

If, at step 405, the communication indicates the request for the remittance processing to the electronic money server 3 by the remitter, the processing unit 130 stands by for receiving the remittance (step 410), and according to the procedure explained in FIG. 2, the processing unit 130 remits, sends a reception confirmation, sends a remittance information, and finishes the processing (step 411, 412, 413).

If, at step 406, the communication does not indicate the request for the reception processing, namely, it does not indicate either of the remittance request and reception request, the processing unit 130 executes an error processing to end (step 415).

If the communication is not received at step 403, the processing unit 130 decides whether or not there are any items registered on the management list in FIG. 6 that expire the retention period 602 from the reception time 601. If there are not any, the step returns to step 403, and if there are some, the processing unit 130 carries out a refund processing to end. In the refund processing, the processing unit 130 cancels a remittance to a receiptor and remits an electronic money to a remitter, whom the processing unit 130 regards as a receiptor. Concretely, if the remitter is registered on the remitter's address 701 and the condition 702 indicates an unconditional transfer to a bank account, the processing unit 130 transfers the electronic money to the bank account and sends to the remitter an electronic mail saying that the money has been remitted to the remitter. And, if the remitter is not registered on the remitter's address 701, the processing unit 130 sends to the remitter an electronic mail saying that the money is going to be remitted to the remitter.

Incidentally, various modifications and applications will be possible without departing the scope and spirit of the invention.

For example, if a receiptor does not receive an electronic money for a certain period of time at steps 404, 414, the processing unit 130 sends an electronic mail to the receiptor to remind; and if the receiptor does not receive for a further certain period, the electronic money may be arranged to be refunded to the remitter. In such a case, the retention period 602 in FIG. 6 may be divided into the first period to remind and the second period to refund for recording corresponding data.

Further, as shown in FIG. 5, 8, since both of the remitter's address and the receiptor's address are designed to be sent in addition to the amount 501 and the identifier 504 inherent to the receiptor, the system is weak in keeping anonymity on transaction. In order to prevent an electronic money from being stolen by the third party, the reception standby request in FIG. 5 may be arranged to send only the amount 501, remitter's address 502, and identifier 504; and the reception standby request in FIG. 8 may be arranged to send only the remitter's address 802 and identifier 803. Further, these transmission information may be enciphered by the public key coding system or the confidential key coding system to increase the security. Still more, the digital signature system may be combined to make the source clear, thereby preventing the illegal use by the third party.

APPLICABILITY IN THE INDUSTRY

According to the invention, the provision of the electronic money server enables an indirect remittance of an electronic money through a communication network. In consequence, the remittance can be carried out when it is convenient to the remitter, and at the same time, the reception can be done when it is convenient to the receiptor.

We claim:

1. An electronic money remittance system comprising:

at least one remitter information processing unit containing storing means for storing/sending electronic money having a money value in such a way as to prevent duplication and counterfeit of the electronic money;

at least one receiptor information processing unit containing storing means for receiving/storing electronic money having a money value in such a way as to prevent duplication and counterfeit of the electronic money;

an electronic money server for receiving electronic money sent from the remitter information processing unit and information relating to the electronic money, for storing the received electronic money in storing means for storing electronic money in such a way as to prevent duplication and counterfeit of the electronic money, and for storing the information relating to the electronic money in other means than said storing means for storing electronic money; and a communication network for connecting the remitter information processing unit and receptor information processing unit to the electronic money server;

wherein the electronic money server receives and stores electronic money sent from the remitter information processing unit as a remitter and designated for the receptor information processing unit as a receiptor, electronically informs the receiptor information processing unit of the stored electronic money and electronically attempts to solicit a remittance request from the receiptor information processing unit, and transfers the stored electronic money to the receiptor information processing unit in accordance with a remittance request from the receiptor information processing unit.

2. An electronic money remittance method, for use in an electronic money system in which communication lines are set up through a communication network between a plurality of IC cards for storing electronic money having a money value to thereby send and receive electronic money via the communication network between the IC cards, the electronic money remittance method comprising the steps of:

connecting to the communication network an electronic money server containing an IC card for temporarily storing electronic money and means for storing information other than electronic money;

sending information to identify a receiving party to the electronic money server by a remitting party and remitting to the electronic money server electronic money, when electronic money is to be sent from a remitting party to a receiving party, and storing the electronic money in the IC card in the electronic money server and the information to identify a receiving party in the means for storing information other than electronic money in the electronic money server;

electronically informing the receiving party of a remittance of electronic money through electronic money transfer by the remitting party, and electronically soliciting a remittance request from the receiving party;

sending to the electronic money server by the receiving party, a remittance request to transfer electronic money remitted by the remitter to the receiving party on the basis of the stored information;

making a decision whether or not it is proper to remit the electronic money by the electronic money server on the basis of the remittance request of the receiving party and the stored information identifying the receiving party;

transferring the electronic money remitted from the remitting party to the receiving party, if the decision result indicates that it is proper to remit the electronic money; and informing the remitting party of the completion of remittance of electronic money to the receiving party.

3. An electronic money remittance method as claimed in claim 2, wherein the information to identify a receiving party contains an address that uniquely recognizes a receiving party on the communication network.

4. An electronic money remittance method as claimed in claim 3, wherein the electronic money server controls a retention period for electronic money received from a remitting party, and sends a reminder of the receipt of the electronic money to the receiving party if a certain period of time passes while the receiving party does not request the electronic money.

5. An electronic money remittance method as claimed in claim 4, wherein the electronic money server refunds the electronic money to the remitter, if a further certain period of time passes after sending a reminder to the receiving party.

6. An electronic money remittance method as claimed in claim 2, wherein the information to identify a receiving party contains an identifier issued by the receiving party, the receiving party sends the identifier to the electronic money server, and the electronic money server correlates the identifier to thereby validate a receptor.

7. An electronic money remittance method as claimed in claim 2, wherein information to identify a receiving party and a corresponding bank account are registered in the electronic money server, and if there is a remittance request to a receptor registered in the electronic money server, the electronic money server transfers the electronic money to the corresponding bank account and sends remittance completion information to the remitting party.

8. A processing method for use in an information processing unit in an electronic money system, in which communication lines are set up through a communication network between a plurality of IC cards for storing electronic money having a money value, the information processing unit being connected to the communication network, whereby electronic money is sent and received through the communication network between IC cards, the processing method in the information processing unit comprising the steps of:

receiving a remittance request from an IC card carrier;

receiving information to identify a receptor contained in a remittance request and electronic money remitted;

storing received electronic money in a storage medium capable of preventing duplication and counterfeit of the electronic money, and storing received information to identify a receptor in other storage medium than said electronic money storage medium;

electronically informing the receptor of the stored electronic money and electronically attempts to solicit a remittance request from the receptor;

correlating, if another IC card carrier requests to receive stored electronic money, the information to identify a receptor contained in the remittance request with the stored information in said other storage medium; and remitting the stored electronic money to the receptor if the correlation produces a coincidence, and refunding the electronic money to a remitter if the correlation does not produce a coincidence.

9. A processing method in an information processing unit as claimed in claim 8, wherein the information processing unit further monitors a retention period for stored electronic money, and refunds the electronic money to the remitter, if the information processing unit does not receive a remittance request from the receptor for a certain period of time.

10. A processing method in an information processing unit as claimed in claim 9, wherein a transfer identifying number corresponding to a receptor is further registered in the information processing unit, and the information processing unit transfers electronic money to the transfer identifying number registered if the information processing unit receives the remittance request.

11. A processing method in an information processing unit as claimed in claim 10, wherein the information processing unit sends reception information to the remitter if the information processing unit receives the electronic money.

12. A processing method in an information processing unit as claimed in claim 11, wherein the information processing unit sends remittance information to the remitter if the information processing unit remits the electronic money to the receptor.

13. An information processing unit, in an electronic money system in which communication lines are set up through a communication network between a plurality of IC cards for storing electronic money having a money value, the information processing unit being connected to the communication network, whereby electronic money is sent and received through the communication network between IC cards, the information processing unit, wherein:

a remittance request is received from an IC card carrier;

information to identify a receptor contained in a remittance request and electronic money remitted are received;

received electronic money is stored in a storage medium capable of preventing duplication and counterfeit of electronic money, and received information to identify a receptor is stored in other storage medium than said electronic money storage medium;

the intended receptor of the stored electronic money is electronically informed together with an attempt to solicit a remittance request from the receptor;

information to identify a receptor contained in a remittance request is correlated with stored information, if another IC card carrier requests to receive stored electronic money; and stored electronic money is remitted to the receptor if the correlation produces a coincidence, and the electronic money is refunded to a remitter if the correlation does not produce a coincidence.

* * * * *